US012750283B2

(12) United States Patent
Rodriguez, Jr. et al.

(10) Patent No.: US 12,750,283 B2
(45) Date of Patent: Sep. 29, 2026

(54) INTERPRETING AND CATEGORIZING TRAFFIC ON INDUSTRIAL CONTROL NETWORKS

(71) Applicant: Siemens Corporation, Washington, DC (US)

(72) Inventors: Luis Humberto Rodriguez, Jr., Ridgefield, CT (US); Charif Mahmoudi, Montclair, NJ (US); Joseph Tylka, Pennington, NJ (US)

(73) Assignee: Siemens Corporation, Washington, DC (US)

( * ) Notice: Subject to any disclaimer, the term of this patent is extended or adjusted under 35 U.S.C. 154(b) by 40 days.

(21) Appl. No.: 19/101,259

(22) PCT Filed: Aug. 11, 2022

(86) PCT No.: PCT/US2022/040041
§ 371 (c)(1),
(2) Date: Feb. 5, 2025

(87) PCT Pub. No.: WO2024/035405
PCT Pub. Date: Feb. 15, 2024

(65) Prior Publication Data
US 2026/0046215 A1 Feb. 12, 2026

(51) Int. Cl.
*H04L 41/14* (2022.01)
*G05B 19/418* (2006.01)
*H04L 9/40* (2022.01)
*H04L 41/142* (2022.01)
*H04L 41/16* (2022.01)

(52) U.S. Cl.
CPC ........ *H04L 41/145* (2013.01); *G05B 19/4186* (2013.01); *H04L 41/142* (2013.01); *H04L 41/16* (2013.01); *H04L 63/1408* (2013.01); *H04L 63/1416* (2013.01)

(58) Field of Classification Search
CPC ..... H04L 41/145; H04L 41/142; H04L 41/16; H04L 63/1408; H04L 63/1416; G05B 19/4186
See application file for complete search history.

(56) References Cited

U.S. PATENT DOCUMENTS 12,328,226 B2 * 6/2025 Zeiger ................. H04L 41/0681
2022/0083027 A1 * 3/2022 Brooks ................... G06F 9/455
2022/0156433 A1 * 5/2022 Laane .............. G05B 19/41885
2022/0383118 A1 * 12/2022 Nair ..................... G06N 3/0455
2024/0414558 A1 * 12/2024 Haustein ............... H04L 41/145

FOREIGN PATENT DOCUMENTS

CN 110958231 A 4/2020
CN 112306019 A 2/2021
CN 114553537 A 5/2022

OTHER PUBLICATIONS

A Review of Network Topology Inference Methods (Year: 2021).*
Network Topology Inference by Exploring Underlying Traffic Behaviors (Year: 2023).*

* cited by examiner

*Primary Examiner* — Shirley X Zhang

(57) ABSTRACT

Tools can generate semantic information that indicates the purpose and contents of messages that are transmitted on a given network. In particular, for example, forensic tools described herein can discriminate between security issues, bugs, performance limitations, user errors, and the like.

15 Claims, 4 Drawing Sheets

INTERPRETING AND CATEGORIZING TRAFFIC ON INDUSTRIAL CONTROL NETWORKS

BACKGROUND

Industrial automation systems can be used to control the operation of machines and other components in a systematic manner. Automation systems can include various automation domains such as factory automation, process automation, building automation, energy automation, and the like. Automation systems can also include equipment from multiple vendors, so as to define industrial control networks that implement different communication protocols. For example, in various legacy and brownfield manufacturing environments, control networks can define a complex and heterogeneous system of devices, protocols, and messages. Current network analysis tools lack capabilities in terms of investigating and discovering various behaviors in such diverse industrial control networks.

BRIEF SUMMARY

Embodiments of the invention address and overcome one or more of the described-herein shortcomings or technical problems by providing methods, systems, and apparatuses for automatically determining behaviors of a various industrial control systems. For example, in accordance with various embodiments, tools can generate semantic information that indicates the purpose and contents of messages that are transmitted on a given network. In particular, for example, forensic tools described herein can discriminate between security issues, bugs, performance limitations, user errors, and the like.

In an example aspect, an industrial control network that defines an IT network and a production network communicatively coupled to each other can perform various operations. The production network can include 1) a plurality of plants that define a plant level communicatively coupled to the IT network, and 2) a plurality of field devices that define a field level. Each plant of the plurality of plants can be communicatively coupled to respective field devices of the plurality of field devices. Edge devices, for instance first edge devices, can monitor first communication traffic exchanged between the IT network and the plant level. Other edge devices, for instance second edge devices, can monitor second communication traffic exchanged between the plant level and the field level. Based on the first communication traffic and the second communication traffic, the network can determine a plurality of communication pairs and communication protocols used by the plurality of communication pairs. Based on the plurality of communication pairs and communication protocols, the network can identify protocol transformations and determine a category associated with each communication pair, so as to define network analysis data associated with each edge device of the first and second edge devices. Based on the network analysis data associated with each edge device of the first and second edge devices, a central computing node of the industrial control network can generate synthetic network traffic data for a network digital twin of the industrial control network. Generating synthetic network traffic data can include generating network data packets between the plurality of communication pairs, generating a series of causally related communication messages between the plurality of communication pairs, or generating statistical representations of the first and second communication traffic. In another example, based on determining the plurality of communication pairs, the network performs a time-dependent statistical analysis of the first and second communication traffic so as to determine causal relationships between the plurality of communication pairs. The causal relationships can define an expected order of communications among the communication pairs. Based on the causal relationships, the network can determine the category associated with each communication pair. In some examples, the category can indicate a traffic type or whether communications performed by each communication pair define automated machine-to-machine communications or operator interactions on a human-machine interface, or whether the communications performed by each communication pair define an anomalous communication pattern indicative of a potential security threat or attack. In various example, a neural network can be trained on the synthetic network traffic data, so as to define the network digital twin of the industrial control network.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

As an initial matter, it is recognized herein that only identifying communications taking place over a given industrial control network is often insufficient to give a user an understanding of how the associated industrial control system is functioning or what functions the control system performs. In particular, for example, medium and large-scale networks often have long operational histories. Such networks, among others, can accrue errors and other kinds of contamination over time, for example, due to successive layers of bad configurations, user errors, security issues, and the like. Embodiments described herein can automatically identify protocols and interpret traffic on industrial control networks, so as to generate semantic information that can discriminate between security issues, bugs, performance issues, user errors, and the like.

By way of background, it is recognized herein that several component technologies can perform network traffic analysis. An example tool is a data-network packet analyzer or network sniffer (e.g., WireShark, tcpdump). Such tools can function so as to capture and parse network packets. In some cases, a network sniffer can define a set of protocol interpreters configured to identify a given protocol and parse the contents of a given message into the standard fields for that identified protocol. Another example tool (libtins C++ library) can perform network sniffing so as to capture and store traffic on a network for later analysis. By way of yet another example, some proprietary drivers can interpret messages from a different automation sources and protocols (e.g., Modbus, MQTT, OPC-UA, S7, etc.). It is recognized herein, however, that current technologies, such as the tools mentioned above, are limited in that, among other shortcomings, the contents of a given payload are not determined. For example, in various example existing approaches, the contents of a data payload cannot be determined without a priori knowledge from a user.

Figure 1:
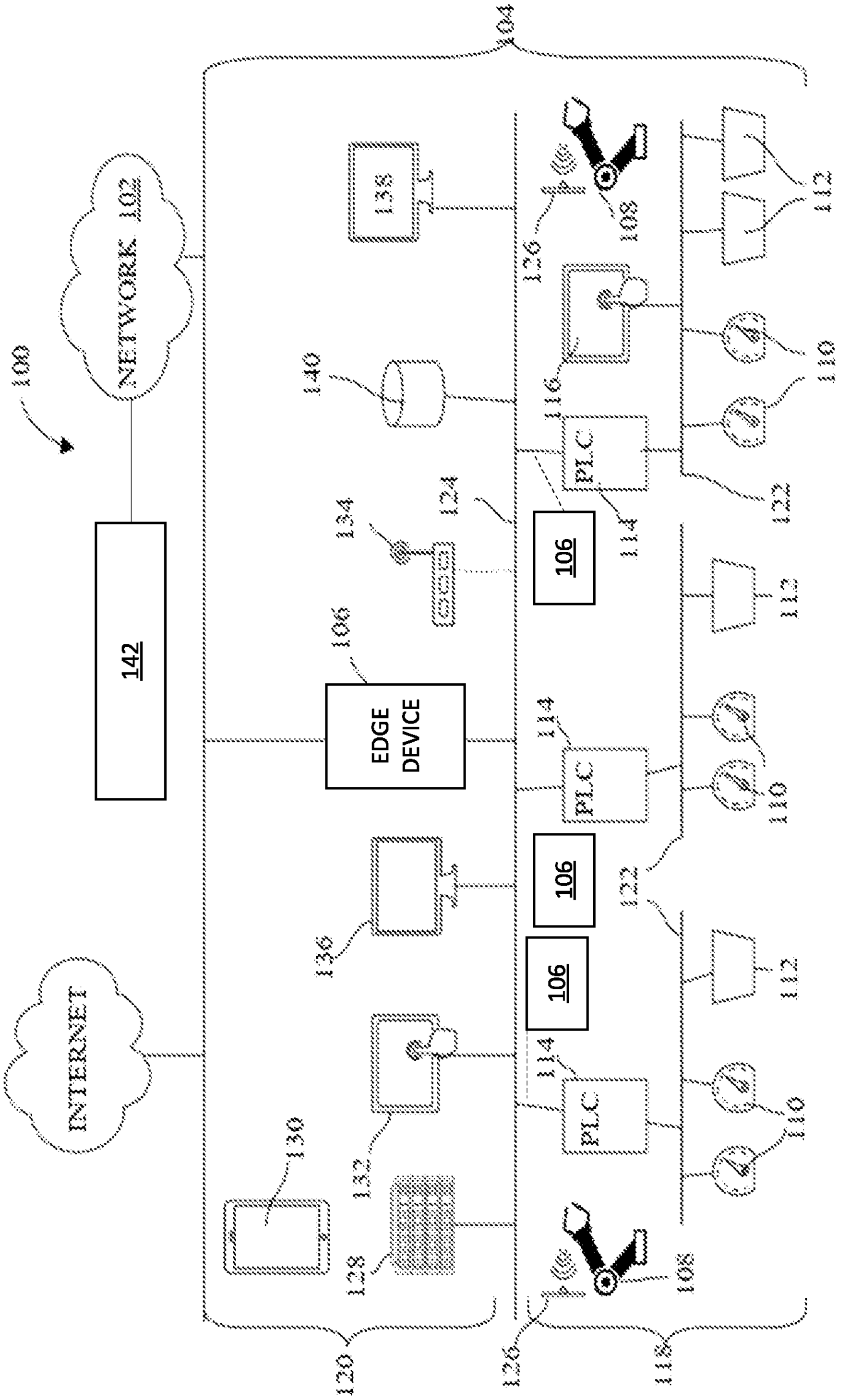
FIG. 1 is a block diagram of an example industrial control network that includes a plurality of edge devices and a central computing node, in accordance with an example embodiment.

Referring initially to FIG. 1, an example automation or industrial control network or system 100 can include one or more plants or production networks 104 that contain control logic, host web servers, and the like. For example, the industrial control network 100 can include an enterprise or IT network 102 and multiple operational plant or production networks 104 communicatively coupled to the IT network 102. The production network 104 or enterprise network 102 can include a plurality of edge devices or sniffer modules 106 connected within the production network 104. The edge devices 106 can define edge network analyzers. An example edge device or sniffer module 106 is connected to the IT network 102. The arrangement of edge devices or sniffer modules 106 can vary as desired, and all such arrangements are contemplated as being within the scope of this disclosure.

Still referring to FIG. 1, the production network 104 can include various production machines configured to work together to perform one or more manufacturing operations. Example production machines of the production network 104 can include, without limitation, robots 108 and other field devices that can be controlled by a respective PLC 114, such as sensors 110, actuators 112, or other machines, such as automatic guided vehicles (AGVs). The PLC 114 can send instructions to respective field devices. In some cases, a given PLC 114 can be coupled to a human machine interfaces (HMIs) 116. It will be understood that the industrial control network 100 is simplified for purposes of example. That is, the industrial control network 100 may include additional or alternative nodes or systems, for instance other network devices, that define alternative configurations, and all such configurations are contemplated as being within the scope of this disclosure.

The network or system 100, in particular each production network 104, can define a field portion or level 118 and plant level or portion 120. For example, and without limitation, the plant level 120 can define one or more industrial plants or systems that can be geographically and functionally separate from or independent of each other. For example, the plant level 120 can include Brownfield plants and Greenfield plants that are each connected to respective field devices within the field level 118. The field level 118 can include various field devices such as the robots 108, PLC 114, sensors 110, actuators 112, HMIs 116, and AGVs. The field portion 118 can define one or more production lines or control zones associated with a given plant in the plant level 120. The PLC 114, sensors 110, actuators 112, and HMI 116 within a given production line can communicate with each other via a respective field bus 122. Each control zone can be defined by a respective PLC 114, such that the PLC 114, and thus the corresponding control zone, can connect to the respective plant portion 120 via an Ethernet connection 124. In some cases, the robots 108 and AGVs can be configured to communicate with other devices within the fieldbus portion 118 via a Wi-Fi connection 126. Similarly, the robots 108 and AGVs can communicate with the Ethernet portion 120, in particular a Supervisory Control and Data Acquisition (SCADA) server 128, via the Wi-Fi connection 126. In various examples, a respective edge device 106 is communicatively coupled between the PLC 114 and the respective plant in the plant level 120, for instance via the Ethernet connection 124 or the Wi-Fi connection 126.

The plant level 120 of a given production network 104 can include various computing devices or subsystems communicatively coupled together via the Ethernet connection 124. Example computing devices or subsystems in the plant portion 120 include, without limitation, a mobile data collector 130, HMIs 132, the SCADA server 128, the edge devices 106, a wireless router 134, a manufacturing execution system (MES) 136, an engineering system(ES) 138, and a log server 140. The ES 138 can include one or more engineering works stations. In an example, the MES 136, HMIs 132, ES 138, and log server 140 are connected to the production network 104 directly. The wireless router 134 can also connect to the production network 104 directly. Thus, in some cases, mobile users, for instance the mobile data collector 130 and robots 108 (e.g., AGVs), can connect to the production network 104 via the wireless router 134.

As described above, the industrial control network or automation system 100 can define a heterogenous IT/OT network, for instance an IT/OT network that includes the IT network 102 and the production network 104. For example, the IT network 102 and the production network 104 can include or implement various devices, protocols, users, network administrators, and the like so as to define a heterogenous IT/OT network. In various examples, the industrial control network 100, and thus the heterogeneous IT/OT network, defines multiple production networks 104 or plants across multiple sites, each with their own operational histories.

Figure 2:
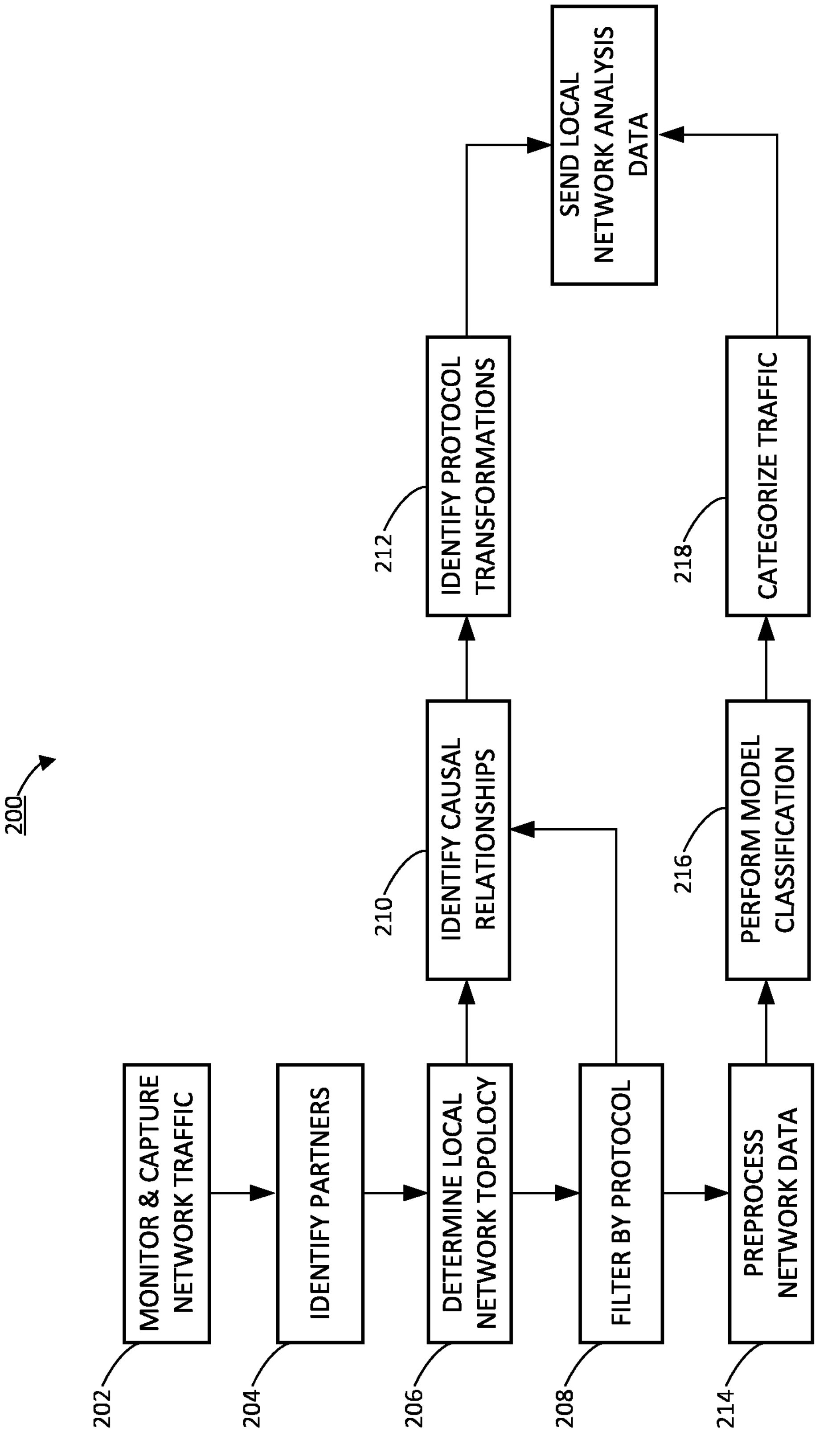
FIG. 2 is a flow diagram that illustrates example operations that can be performed by each of the edge devices of the plurality of edge devices, in accordance with an example embodiment.

Referring also to FIG. 2, example operations 200 can be performed by the industrial control network 100, in particular the edge devices or sniffer modules 106. It should be appreciated that functionality described as being supported by program modules of the automation system 100 (e.g., edge devices or sniffer modules 106) may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules. Thus, it will be also understood that the automation system 100 is simplified to illustrate an example, and the automation system 100 can vary as desired, and all such automation systems are contemplated as being within the scope of this disclosure.

At 202, the edge devices 106 can monitor traffic between the field level 118 and the plant level 120 so as to capture OT network traffic. Additionally, at 202, the edge devices or network sniffer modules 106 can monitor traffic between the plant level 120 and the IT or enterprise network 102, so as to capture IT network traffic. At 204, based on the monitored traffic, the edge devices 106 can identify communication partners or pairs. For example, the communication partners or pairs can be determined from the captured network data packets in the form of source and destination addresses. At 206, the edge devices 106 can combine the IT network traffic and the OT network traffic, and based on the combined IT network traffic and the OT network traffic, the edge devices 106 can determine a local network topology. In particular, for example, a local network topology can be modeled as a node graph in which devices on the networks are represented as nodes, and interconnections between devices via a wireless connection or a network cable are represented as edges (lines). By examining the network data packets for source and destination addresses, a logical mapping of communication pairs can be accumulated over time. When superimposed, these communication pairs can form the local network topology. In some cases, open-source software tools can generate such network graphs (e.g., nmap). In an example, the edge device 106 may have a necessarily limited view on both the OT and IT networks, as typical large-scale networks involve multiple nested layers of subnetworks, each of which can be masked by network routers, for example.

Still referring to FIG. 2, communication partners or pairs can define nodes or devices that communicate with each other. For example, a communication pair can define a node in the IT network 102 and a node in the production network 104 at the plant level 120 that communicate with each other. By way of further example, a communication pair can define a node at the plant level 120 within the production network 104 and a node in the field level 118 within the production network 104 that communicate with each other. At 208, the edge devices 106 can filter the identified communication partners by the communication protocols that each pair uses for their communication, so as to define filtered communication partners. Communication protocols can be identified from the network traffic in various ways, for instance based on standard network port assignments for a given protocol, from metadata included in the headers of the network data packets, or through deep packet inspection techniques. In particular, for example, the EtherType field of the packet structure can enable the protocol at the lower level of the networking stack to be identified, and the application-level protocols can be collected from headers such as HTTP. In some cases, open-source software tools (e.g., wireshark) can be implemented by the edge device 106 for protocol classification based on packet analysis.

At 210, based on the filtered communication partners, the edge devices 106 can identify causal relationships. In OT networks, for example in production automation, different automation devices can be used to coordinate a precise and highly repeatable sequence of actions. For example, an automation controller may receive a command message from a manufacturing execution system and, in response, send a control signal to a specific production machine. This kind of causality, wherein one communication action directly causes the next one to occur, is essential to OT networks that are responsible for executing deterministic, precisely coordinated, and highly repeatable sequences of events. Identifying such causal relationships can be achieved through a time-dependent statistical analysis of the OT network traffic. In particular, for example, repeating communications can be identified from a network traffic dataset by counting the frequency of occurrence for each message sent between communication partners with similar payload contents and over the same protocol. Then, for example, a time-based cross-correlation analysis between two such repeated communications, say communication A and B, might reveal the degree to which the communications are correlated, and if any consistent time offset between the two communications exists. In some examples, a positive time offset indicates that communication A occurs before communication B, and a negative time offset indicates that communication A occurs after communication B. Those examples define example patterns of communication that recure every cycle in an industrial production system. By observing those communications, a causality relationship is built (or identified) based on the recurrence of the events exchanged between devices.

With continuing reference to FIG. 2, at 212, based on the identified causal relationships, the edge devices 106 can identify protocol transformations. Continuing with the above example from 210, the communication protocols of communication A and communication B might be already known, so the change from one network protocol to another is apparent. In such examples, the transformations can include mapping data fields based on labels to the schema of the target protocol. At 214, based on the filtered communication partners from 208, the edge devices 206 can preprocess the network traffic data so as to define preprocessed traffic data. Such preprocessing can include performing time domain mathematical operations such as, for example and without limitation, signal resampling, Fourier transformations to compute spectral coefficients, or extracting statistical features such as frequencies of occurrence of particular communications in a moving time window. At 216, after the network traffic data is preprocessed, the edge devices 106 can classify the preprocessed traffic data. In particular, for example, the edge devices or sniffer modules 106 can input the preprocessed traffic data into a neural network or machine learning model so as to generate output classifications or categories associated with the traffic data. Such network traffic data can be classified in terms of traffic type, for example, to distinguish automated machine-to-machine communications from operator interactions on a human-machine interface (HMI). In example cases involving unencrypted network traffic, data packet contents can be identified using deep learning models, for which the modules 106 can generate labeled datasets of different classes or categories of transmissions (e.g., images, time-series, error codes, etc.) and of different communication protocols (e.g., HTTP, MQTT, FTP, etc.) Further, the modules 106 can train classifier models for such content types and desired protocols.

In example cases involving encrypted traffic, the statistical features of the network traffic can be sufficient to classify data flow patterns and to distinguish between nominal healthy system behaviors and anomalous or unintended behaviors. Synthetic statistical features of such kinds of network traffic can be generated to train neural network-based classification or anomaly detection models. In some cases, the types of classifications or categories can be determined based on aspects of interest to the network administrator or operations manager. For example, an operations manager may be interested in distinguishing human-machine interactions from automated machine-to-machine communications to oversee the frequency of human intervention in the otherwise automated operations, or to look for anomalous or suspicious human operations occurring at unexpected times during operation. By way of further example, network administrators or cybersecurity specialists may be interested in identifying anomalous communication patterns indicative of a potential security threat or attack.

At 218, based on the output classifications from 216, the edge devices 106 can determine a category, or traffic type, for each of the identified communication pairs. At 220, the edge devices 106 can send the category associated with each communication pair, and the identified protocol transformations, which can collectively define local network analysis data, to a central computing node or processor. In some cases, the edge devices 106 send the respective local network analysis data at 220 to a central computing node or module or system 142 on the IT network 102.

Figure 3:
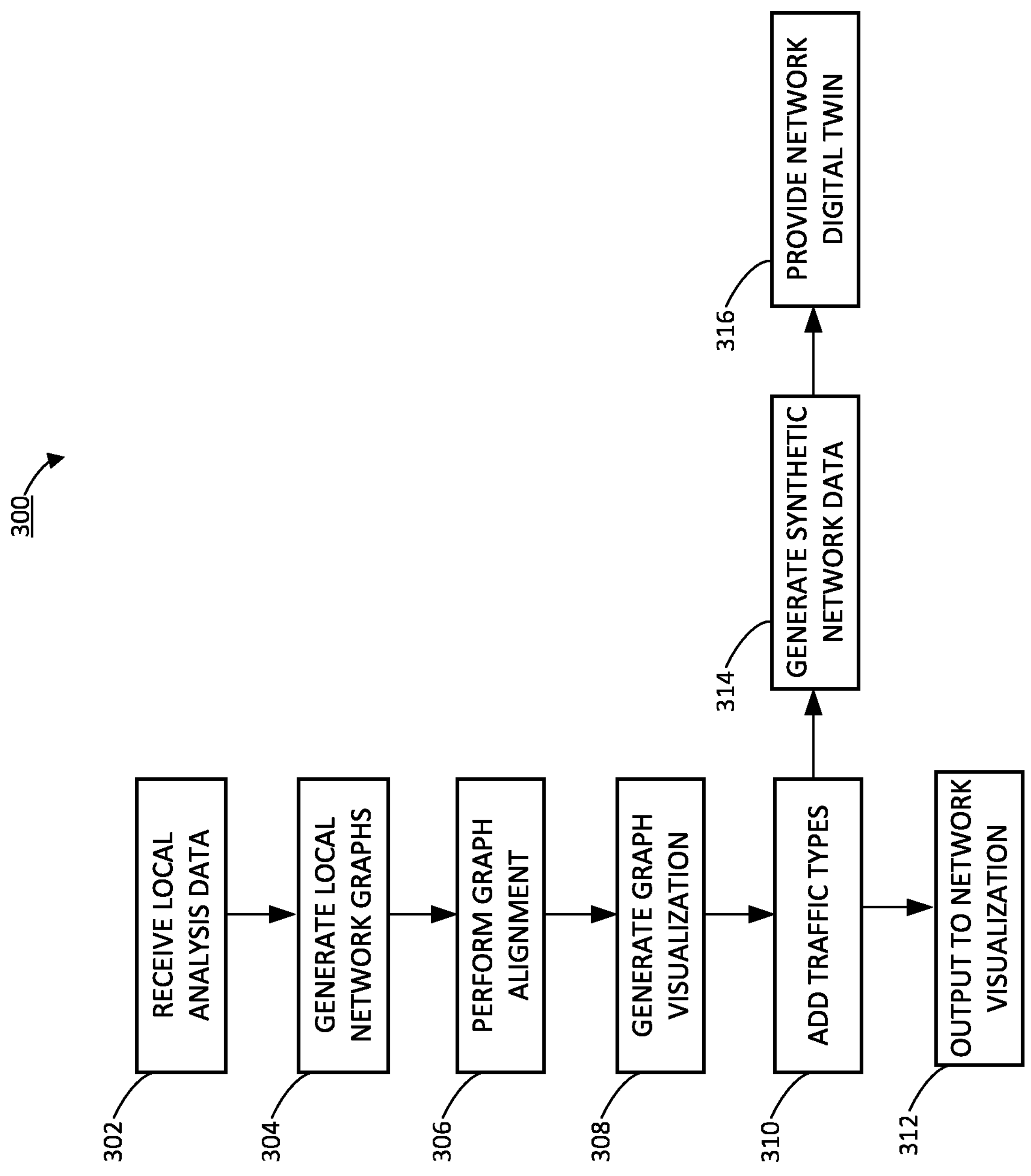
FIG. 3 is a flow diagram that illustrates example operations that can be performed by the central computing node, in accordance with an example embodiment.

Referring now to FIG. 3, example operations 300 can be performed by a central computing node in communication with the production networks 104, for instance the central computing system 142. For example, at 302, the central computing node 142 receives the local network analysis data from respective edge devices or modules 106. For each local network analysis data associated with a given edge device 106, the central computing node 142 can generate a local network graph, at 304. The local network graphs can mirror respective graph representations of the local network topology, as described above with reference to 204. Thus, each edge device 106 that generates local network analysis data can be associated with a respective local network graph. Based on the plurality of local network graphs, at 306, the central computing node 142 can perform graph alignment. For example, graph alignment can consist of attempting to find a suitable superposition of two partial graphs with at least one network device or node in common, in order to form a single comprehensive graph of the entire network. For that purpose, in an example, the node 142 performs timing correlation between events that are shared between networks. For example, if a modbus device of a first network is bridged using OPC-UA to a second modbus network, three distinct local graphs can be defined. Based on the chronology of the communication patterns identified, the links between those local graphs can be inferred. That can enable a reconstruction of the digital twin of the global network. The composed graph can then be validated using temporal logic, such as Signal-Temporal Logic for example, to ensure the consistency of the inferred graph. For example, the communications times between components can be assumed to respect physical properties, such as the speed of light or a reasonable time for switching the packets in the network.

Still referring to FIG. 3, at 308, after graph alignment is performed, the central computing node 142 can generate a graph visualization. The graph visualization can be generated based on the underlying digital representation of network devices as nodes and communication channels as edges on the graph. In some cases, the node 142 implements an open source software tool (e.g., pyvis) to generate dynamic and interactive visualizations of such network graphs. At 310, the central computing node 142 can add context information to the graph visualization, so as to define a graph visualization with context information. Such context information can include the category or traffic type associated with the communication pairs. At 312, the central computing node 142 can send an output that includes the graph visualization with context information to a network visualization module or dashboard, or the central computing node 142 can otherwise display the graph visualization with context information to a user. Such visualization systems can be used by network administrators, for example in a security operations center or industrial operations monitoring center. Dashboards can include visualization widgets showing simplified or aggregated important results, such as, for example and without limitation, the number of anomalous protocols, new network participants, deviations in established communication patterns, etc. In various examples, such dashboards or displays can provide an operations manager with quick and vital insights into the overall health or security status of the industrial network.

With continuing reference to FIG. 3, at 314, the central computing node 142 can generate synthetic network traffic data from the graph visualization with context information. Such synthetic network traffic data can include, for example and without limitation, individual network data packets between known communication partners, a series of causally related communication messages between known communication partners, and aggregated or statistical representations of network traffic (e.g., in terms of data flow rates, throughput, latencies, etc.). Synthetic network data can be generated using machine learning models trained on historical data, for example using a generative adversarial network training methodology. At 316, the central computer computing node 142 can provide the synthetic network traffic data to other users or applications for further network analysis. Thus, in various examples, aspects of the presently disclosed system comprise a digital twin of the industrial control network 100, for instance a holistic network digital twin (NDT), due to its comprehensive modeling and synthetic data generation capabilities. Digital twin technologies are commonly used in industrial applications to capture physical aspects and functional behaviors of a system, and additionally to provide realistic simulations of the modeled system. In this context described herein, for example, a network digital twin captures and simulates the behavior of the modeled communication network.

Thus, as described above, the industrial control network can increase visibility into IT-OT networks, for example, by performing local network traffic analysis on multiple distributed edge devices 106, and by fusing the collected network data into a holistic network digital twin (NDT). The NDT can define a topological representation of the network 100 that is augmented with contextual information. The contextual information can include, for example, the type of network traffic taking place between each communication partner or network pair. Additionally, in some examples, the NDT enables synthetic generation of artificial network traffic data. For example, on each edge device 106, deep learning models can be used to perform categorization of the traffic based on the network protocol and communication patterns being used. Thus, continuing with the example, visibility into the actual traffic content is not required, such that encrypted network traffic can be categorized. In various examples, causal relationships between network traffic and events can be inferred due to the convergence of OT and IT network traffic at the edge devices 106. Furthermore, the overall NDT can be generated (e.g., at 316) through data fusion and graph alignment that is performed on the central computing node 142 (e.g., on the cloud or an on-site server), which receives local network insights from each configured edge device 106, at 302.

Figure 4:
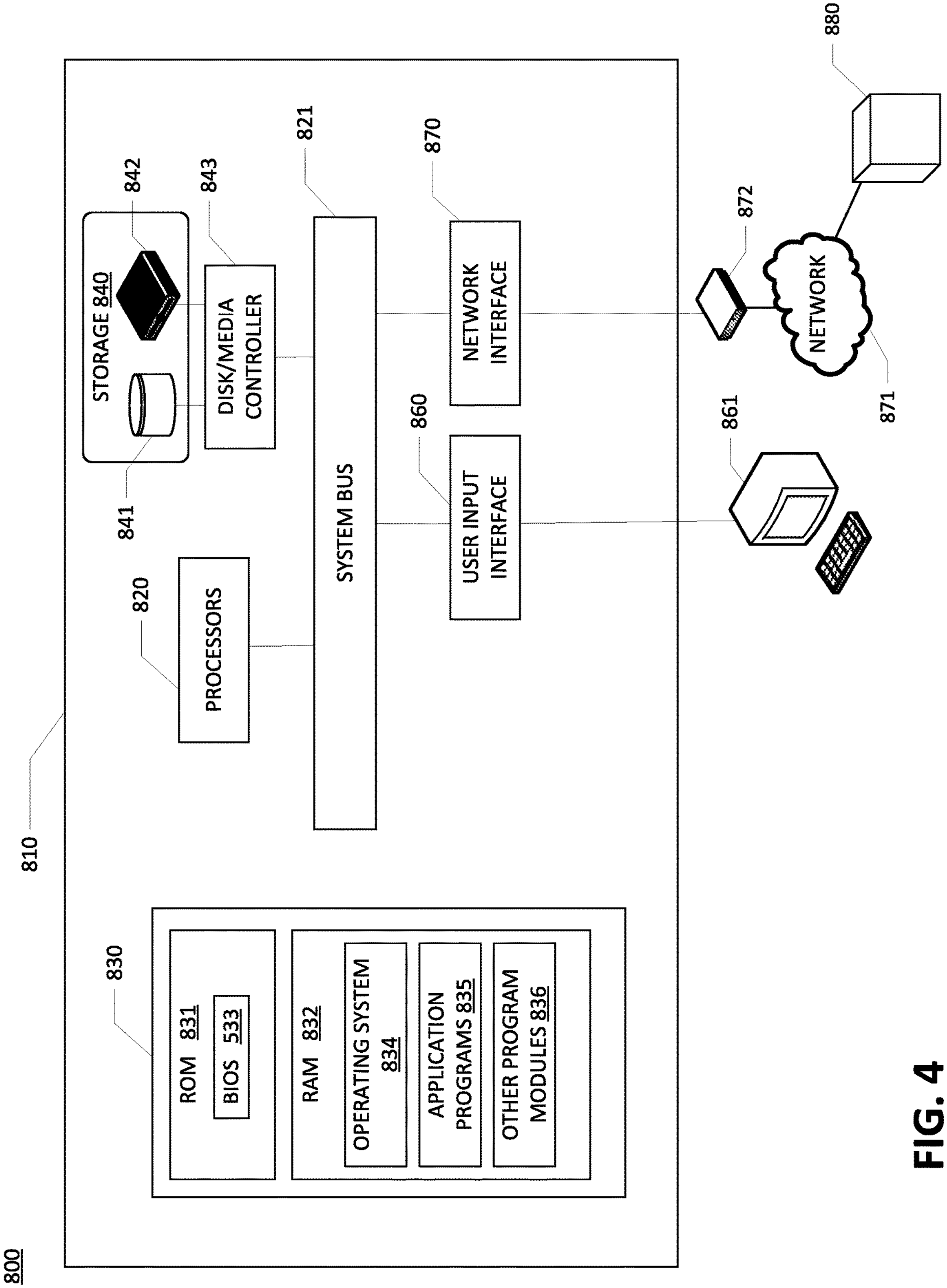
FIG. 4 shows an example of a computing environment within which embodiments of the disclosure may be implemented.

FIG. 4 illustrates an example of a computing environment within which embodiments of the present disclosure may be implemented. A computing environment 800 includes a computer system 810 that may include a communication mechanism such as a system bus 821 or other communication mechanism for communicating information within the computer system 810. The computer system 810 further includes one or more processors 820 coupled with the system bus 821 for processing the information. The industrial control network 100 may include, or be coupled to, the one or more processors 820.

The processors 820 may include one or more central processing units (CPUs), graphical processing units (GPUs), or any other processor known in the art. More generally, a processor as described herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general purpose computer. A processor may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 820 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor may be capable of supporting any of a variety of instruction sets. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

The system bus 821 may include at least one of a system bus, a memory bus, an address bus, or a message bus, and may permit exchange of information (e.g., data (including computer-executable code), signaling, etc.) between various components of the computer system 810. The system bus 821 may include, without limitation, a memory bus or a memory controller, a peripheral bus, an accelerated graphics port, and so forth. The system bus 821 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

Continuing with reference to FIG. 4, the computer system 810 may also include a system memory 830 coupled to the system bus 821 for storing information and instructions to be executed by processors 820. The system memory 830 may include computer readable storage media in the form of volatile and/or nonvolatile memory, such as read only memory (ROM) 831 and/or random access memory (RAM) 832. The RAM 832 may include other dynamic storage device(s) (e.g., dynamic RAM, static RAM, and synchronous DRAM). The ROM 831 may include other static storage device(s) (e.g., programmable ROM, erasable PROM, and electrically erasable PROM). In addition, the system memory 830 may be used for storing temporary variables or other intermediate information during the execution of instructions by the processors 820. A basic input/output system 833 (BIOS) containing the basic routines that help to transfer information between elements within computer system 810, such as during start-up, may be stored in the ROM 831. RAM 832 may contain data and/or program modules that are immediately accessible to and/or presently being operated on by the processors 820. System memory 830 may additionally include, for example, operating system 834, application programs 835, and other program modules 836. Application programs 835 may also include a user portal for development of the application program, allowing input parameters to be entered and modified as necessary.

The operating system 834 may be loaded into the memory 830 and may provide an interface between other application software executing on the computer system 810 and hardware resources of the computer system 810. More specifically, the operating system 834 may include a set of computer-executable instructions for managing hardware resources of the computer system 810 and for providing common services to other application programs (e.g., managing memory allocation among various application programs). In certain example embodiments, the operating system 834 may control execution of one or more of the program modules depicted as being stored in the data storage 840. The operating system 834 may include any operating system now known or which may be developed in the future including, but not limited to, any server operating system, any mainframe operating system, or any other proprietary or non-proprietary operating system.

The computer system 810 may also include a disk/media controller 843 coupled to the system bus 821 to control one or more storage devices for storing information and instructions, such as a magnetic hard disk 841 and/or a removable media drive 842 (e.g., floppy disk drive, compact disc drive, tape drive, flash drive, and/or solid state drive). Storage devices 840 may be added to the computer system 810 using an appropriate device interface (e.g., a small computer system interface (SCSI), integrated device electronics (IDE), Universal Serial Bus (USB), or FireWire). Storage devices 841, 842 may be external to the computer system 810.

The computer system 810 may also include a field device interface 865 coupled to the system bus 821 to control a field device 866, such as a device used in a production line. The computer system 810 may include a user input interface or GUI 861, which may comprise one or more input devices, such as a keyboard, touchscreen, tablet and/or a pointing device, for interacting with a computer user and providing information to the processors 820.

The computer system 810 may perform a portion or all of the processing steps of embodiments of the invention in response to the processors 820 executing one or more sequences of one or more instructions contained in a memory, such as the system memory 830. Such instructions may be read into the system memory 830 from another computer readable medium of storage 840, such as the magnetic hard disk 841 or the removable media drive 842. The magnetic hard disk 841 and/or removable media drive

842 may contain one or more data stores and data files used by embodiments of the present disclosure. The data store 840 may include, but are not limited to, databases (e.g., relational, object-oriented, etc.), file systems, flat files, distributed data stores in which data is stored on more than one node of a computer network, peer-to-peer network data stores, or the like. The data stores may store various types of data such as, for example, skill data, sensor data, or any other data generated in accordance with the embodiments of the disclosure. Data store contents and data files may be encrypted to improve security. The processors 820 may also be employed in a multi-processing arrangement to execute the one or more sequences of instructions contained in system memory 830. In alternative embodiments, hard-wired circuitry may be used in place of or in combination with software instructions. Thus, embodiments are not limited to any specific combination of hardware circuitry and software.

As stated above, the computer system 810 may include at least one computer readable medium or memory for holding instructions programmed according to embodiments of the invention and for containing data structures, tables, records, or other data described herein. The term "computer readable medium" as used herein refers to any medium that participates in providing instructions to the processors 820 for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks, such as magnetic hard disk 841 or removable media drive 842. Non-limiting examples of volatile media include dynamic memory, such as system memory 830. Non-limiting examples of transmission media include coaxial cables, copper wire, and fiber optics, including the wires that make up the system bus 821. Transmission media may also take the form of acoustic or light waves, such as those generated during radio wave and infrared data communications.

Computer readable medium instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, may be implemented by computer readable medium instructions.

The computing environment 800 may further include the computer system 810 operating in a networked environment using logical connections to one or more remote computers, such as remote computing device 880. The network interface 870 may enable communication, for example, with other remote devices 880 or systems and/or the storage devices 841, 842 via the network 871. Remote computing device 880 may be a personal computer (laptop or desktop), a mobile device, a server, a router, a network PC, a peer device or other common network node, and typically includes many or all of the elements described above relative to computer system 810. When used in a networking environment, computer system 810 may include modem 872 for establishing communications over a network 871, such as the Internet. Modem 872 may be connected to system bus 821 via user network interface 870, or via another appropriate mechanism.

Network 871 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 810 and other computers (e.g., remote computing device 880). The network 871 may be wired, wireless or a combination thereof. Wired connections may be implemented using Ethernet, Universal Serial Bus (USB), RJ-6, or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 871.

It should be appreciated that the program modules, applications, computer-executable instructions, code, or the like depicted in FIG. 4 as being stored in the system memory 830 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the computer system 810, the remote device 880, and/or hosted on other computing device(s) accessible via one or more of the network(s) 871, may be provided to support functionality provided by the program modules, applications, or computer-executable code depicted in the figures and/or additional or alternate functionality. Further, functionality may be modularized differently such that processing described as being supported collectively by the collection of program modules depicted in the figures may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in the figures may be implemented, at least partially, in hardware and/or firmware across any number of devices.

It should further be appreciated that the computer system 810 may include alternate and/or additional hardware, software, or firmware components beyond those described or depicted without departing from the scope of the disclosure. More particularly, it should be appreciated that software, firmware, or hardware components depicted as forming part of the computer system 810 are merely illustrative and that some components may not be present or additional components may be provided in various embodiments. While various illustrative program modules have been depicted and described as software modules stored in system memory 530, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like can be additionally based on one or more other operations, elements, components, data, or the like. Accordingly, the phrase "based on," or variants thereof, should be interpreted as "based at least in part on."

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method performed within an industrial control network that defines an IT network and a production network communicatively coupled to each other, the production network comprising 1) a plurality of plants that define a plant level communicatively coupled to the IT network, and 2) a plurality of field devices that define a field level, each plant of the plurality of plants communicatively coupled to respective field devices of the plurality of field devices, the method comprising:

monitoring, by first edge devices, first communication traffic exchanged between the IT network and the plant level;

monitoring, by second edge devices, second communication traffic exchanged between the plant level and the field level;

based on the first communication traffic and the second communication traffic, determining a plurality of communication pairs and communication protocols used by the plurality of communication pairs;

based on the plurality of communication pairs and communication protocols, identifying protocol transformations and determining a category associated with each communication pair, so as to define network analysis data associated with each edge device of the first and second edge devices; and based on the network analysis data associated with each edge device of the first and second edge devices, generating synthetic network traffic data for a network digital twin of the industrial control network.

2. The method as recited claim 1, wherein generating synthetic network traffic data further comprises, based on the network analysis data:

generating network data packets between the plurality of communication pairs;

generating a series of causally related communication messages between the plurality of communication pairs; and generating statistical representations of the first and second communication traffic.

3. The method as recited in claim 1, the method further comprising:

based on determining the plurality of communication pairs, performing a time-dependent statistical analysis of the first and second communication traffic so as to determine causal relationships between the plurality of communication pairs, the causal relationships defining an expected order of communications among the communication pairs.

4. The method as recited in claim 3, the method further comprising:

based on the causal relationships, determining the category associated with each communication pair, wherein the category indicates whether communications performed by each communication pair define automated machine-to-machine communications or operator interactions on a human-machine interface, or whether the communications performed by each communication pair define an anomalous communication pattern indicative of a potential security threat or attack.

5. The method as recited in claim 1, the method further comprising:

training a neural network on the synthetic network traffic data, so as to define the network digital twin of the industrial control network.

6. A computing system comprising:

a memory having a plurality of application modules stored thereon; and a processor for executing the application modules, the modules configured to:

monitor first communication traffic exchanged between an IT network and a plant level of a production network, the IT network and the production network defined by an industrial control network;

monitoring, by second edge devices, second communication traffic exchanged between the plant level and the field level;

based on the first communication traffic and the second communication traffic, determining a plurality of communication pairs and communication protocols used by the plurality of communication pairs;

based on the plurality of communication pairs and communication protocols, identifying protocol transformations and determining a category associated with each communication pair, so as to define network analysis data associated with each edge device of the first and second edge devices; and based on the network analysis data associated with each edge device of the first and second edge devices, generating synthetic network traffic data for a network digital twin of the industrial control network.

7. The system as recited in claim 6, the modules further configured to, based on the network analysis data:

generate network data packets between the plurality of communication pairs;

generate a series of causally related communication messages between the plurality of communication pairs; and generate statistical representations of the first and second communication traffic.

8. The system as recited in claim 6, the modules further configured to:

based on determining the plurality of communication pairs, perform a time-dependent statistical analysis of the first and second communication traffic so as to determine causal relationships between the plurality of communication pairs, the causal relationships defining an expected order of communications among the communication pairs.

9. The system as recited in claim 8, the modules further configured to:

based on the causal relationships, determine the category associated with each communication pair, wherein the category indicates whether communications performed by each communication pair define automated machine-to-machine communications or operator interactions on a human-machine interface, or whether the communications performed by each communication pair define an anomalous communication pattern indicative of a potential security threat or attack.

10. The system as recited in claim 6, the modules further configured to:

train a neural network on the synthetic network traffic data, so as to define the network digital twin of the industrial control network.

11. A non-transitory computer-readable storage medium including instructions that, when processed by a computing system cause the computing system to perform operations comprising:

monitoring first communication traffic exchanged between an IT network and a plant level of a production network, the IT network and the production network defined by an industrial control network;

monitoring second communication traffic exchanged between the plant level and a field level of the production network;

based on the first communication traffic and the second communication traffic, determining a plurality of communication pairs and communication protocols used by the plurality of communication pairs;

based on the plurality of communication pairs and communication protocols, identifying protocol transformations and determining a category associated with each communication pair, so as to define network analysis data associated with edge devices of the industrial control network; and based on the network analysis data associated with each edge device, generating synthetic network traffic data for a network digital twin of the industrial control network.

12. The computer-readable storage medium as recited in claim 11, the operations further comprising, based on the network analysis data:

generating network data packets between the plurality of communication pairs;

generating a series of causally related communication messages between the plurality of communication pairs; and generating statistical representations of the first and second communication traffic.

13. The computer-readable storage medium as recited in claim 11, the operations further comprising:

based on determining the plurality of communication pairs, performing a time-dependent statistical analysis of the first and second communication traffic so as to determine causal relationships between the plurality of communication pairs, the causal relationships defining an expected order of communications among the communication pairs.

14. The computer-readable storage medium as recited in claim 13, the operations further comprising:

based on the causal relationships, determining the category associated with each communication pair, wherein the category indicates whether communications performed by each communication pair define automated machine-to-machine communications or operator interactions on a human-machine interface, or whether the communications performed by each communication pair define an anomalous communication pattern indicative of a potential security threat or attack.

15. The computer-readable storage medium as recited in claim 11, the operations further comprising:

training a neural network on the synthetic network traffic data, so as to define the network digital twin of the industrial control network.

* * * * *